Patented Jan. 24, 1939

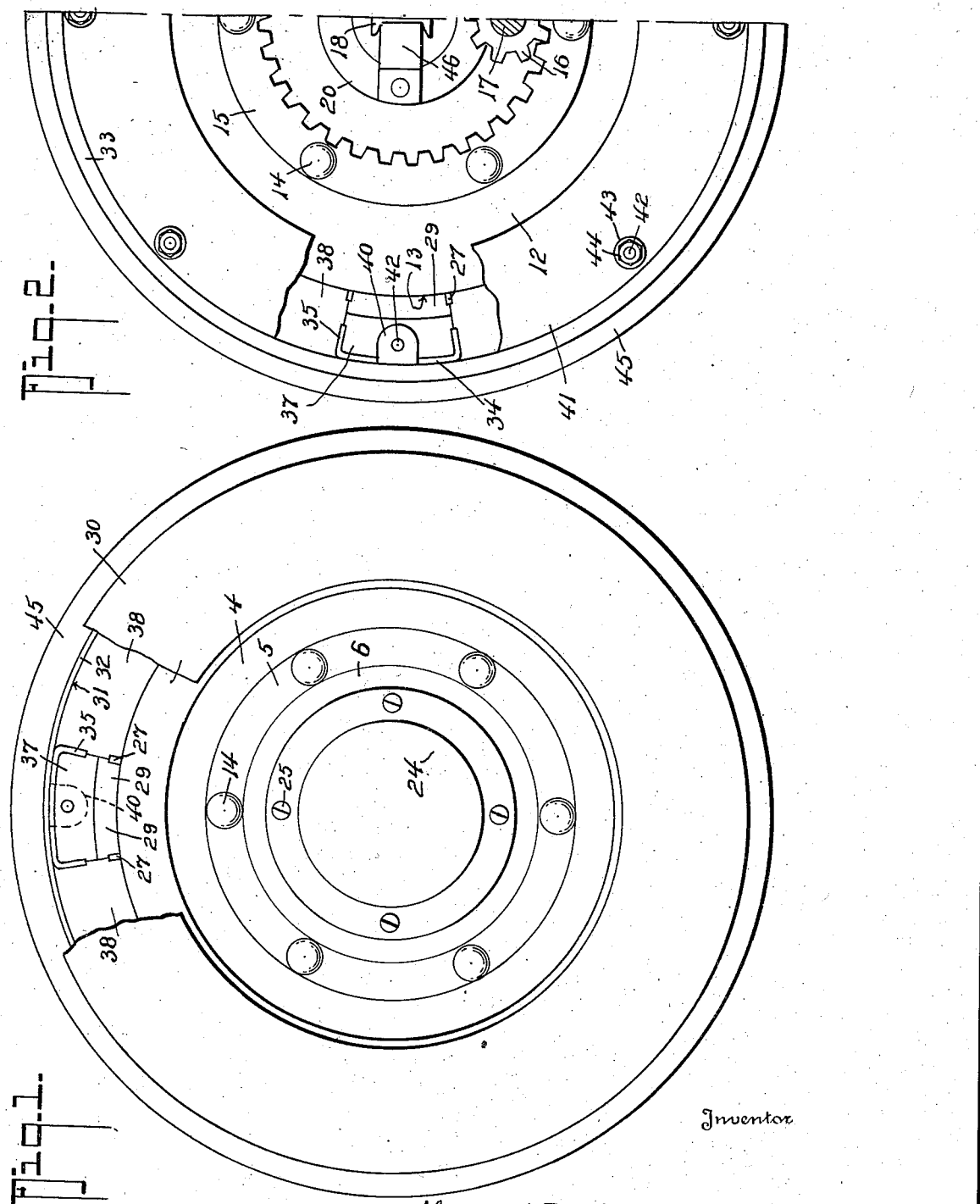

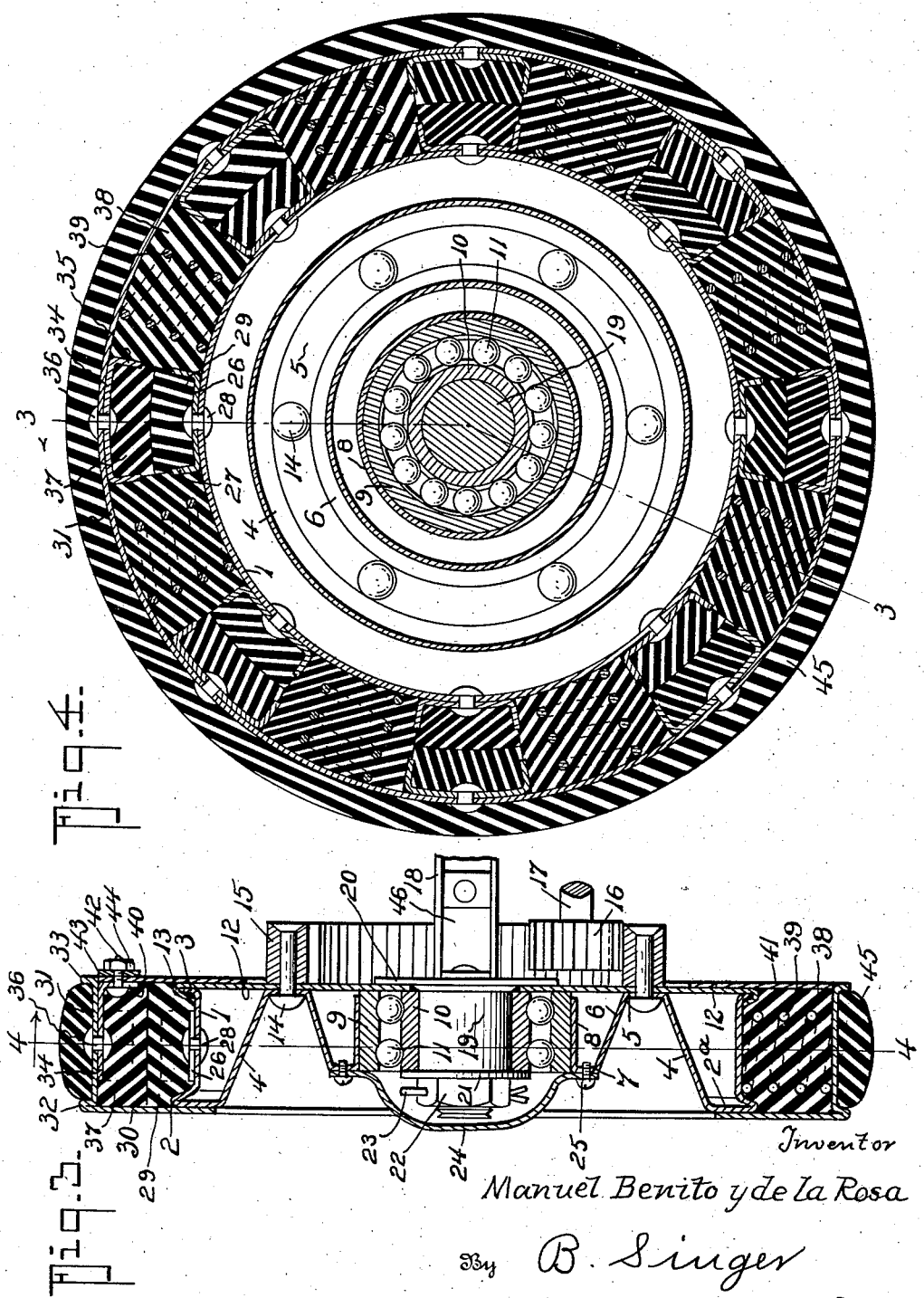

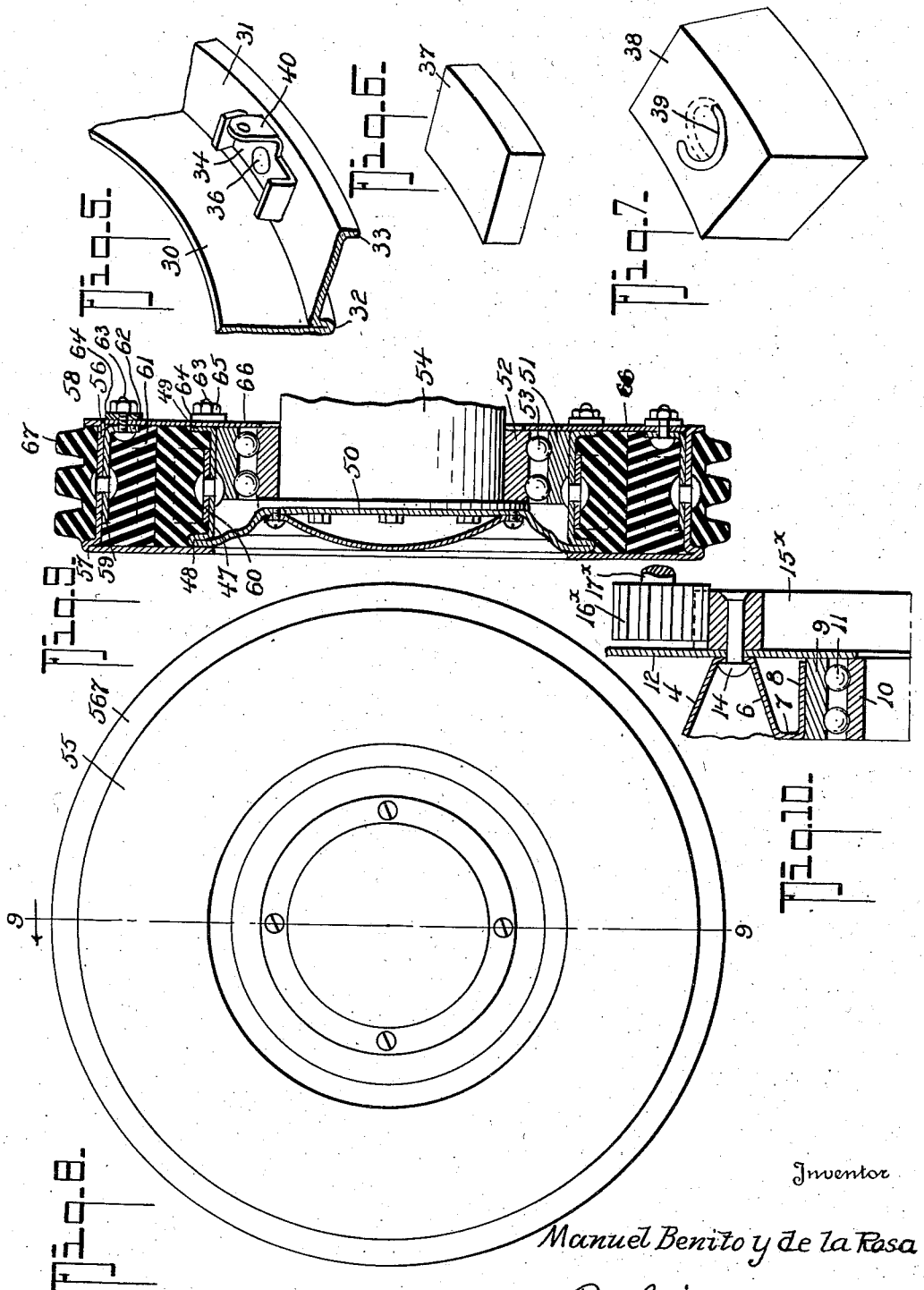

2,145,159

UNITED STATES PATENT OFFICE 2,145,159

RESILIENT VEHICLE WHEEL

Manuel Benito y de la Rosa, Habana, Cuba, assignor of one-half to Rafael del Valle y Medina, Habana, Cuba Application September 8, 1937, Serial No. 162,951
In Cuba October 30, 1936

4 Claims. (Cl. 152—36)

My invention relates to certain new and useful improvements in wheels for vehicles, particularly heavy vehicles such as busses, trucks and the like.

The invention primarily has for its object to provide a wheel composed of an inner member and an outer member each having a rim, between which are located resilient blocks to absorb road and other shocks, the outer member carrying on its periphery a cushion tire of suitable construction.

Further, it is an object to provide such a wheel, constructed to facilitate assembly of its parts and to enable replacement of the shock-absorbing elements to be made when necessary or desirable.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:—

Fig. 1 is a side elevation of a wheel embodying my invention, a portion being broken away to show hidden parts.

Fig. 2 is a rear elevation of one-half of a wheel, parts being broken away.

Fig. 3 is a vertical cross-section of the wheel taken on the line 3—3 of Fig. 4.

Fig. 4 is a vertical longitudinal section of the wheel taken on the line 4—4 of Fig. 3.

Fig. 5 is a detail perspective view of a portion of the outer member.

Fig. 6 is a detail perspective view of one of the cushion blocks.

Fig. 7 is a detail perspective view of one of the spring bearing blocks.

Fig. 8 is a side elevation of a modified form of the wheel.

Fig. 9 is a cross section on the line 9—9 of Fig. 8.

Fig. 10 is a detail cross section showing a slight modification of the wheel driving gear ring.

In the drawings, in which like numerals and letters of reference indicate like parts in all of the figures, 1 represents the rim of the inner member of the wheel. This member includes the outer wall 2ª, which is dished-in to form frusto-conical walls 4 and 6, and a back annular wall portion 5. It is also provided with a flat annular wall portion 7 and a cylindrical hub-like wall 8 in which the ball-race 9 is located.

The ball-race 9 forms one part of an antifriction bearing whose other parts comprise the race 10 and bearing balls 11.

The rim 1 of the inner member of the wheel is formed with side flanges 2 and 3.

12 designates a back plate or disc whose periphery is extended over the flange 3 as at 13 and whose body is secured to the wall portion 5 by rivets 14, or in any other suitable way, as for example, spot welding. The plate 12 overlaps the bearing 9—11—10 and serves to close the inner side thereof, to prevent access of dirt and moisture to the bearings.

When the wheel is a driving wheel, a ring gear 15 is secured thereto, either by the rivets 14 or in any other suitable way. This ring gear 15 may be driven by a pinion 16 on a driving shaft 17 and it may be an internal ring gear, as shown in Figs. 2 and 3, or it may have its teeth on its outer periphery, as at 15ˣ in Fig. 10, in which event the pinion 16ˣ and shaft 17ˣ will be arranged accordingly.

The axle 18 is stationary and includes a portion 19 to fit into the race 10, and a reduced threaded end to receive a washer 21, nut 22 and cotter pin 23. It is also provided with a flange 20 to cooperate with plate 12 to keep out dust and dirt and to cooperate with the washer 21 to hold the wheel in place on the axle.

A cap 24, secured in any suitable way, as by screws 25 to the wheel, closes the outer side of the wheel bearing-chamber and cooperates with flange 20 to keep out foreign matter.

The inner member of the wheel carries, at suitable intervals around its rim 1, a set of cushion-block holders 26 consisting of elongated plates having radially disposed flanges 27. The holders 26 are secured to the rim 1 by rivets 28, or in any other suitable way.

Within the holders 26 are cushion blocks 29 of rubber or other suitable resilient material which cooperate with similar blocks 37 carried in holders 34 having flanges 35 and being secured, at 36, to the rim 31 of the outer member of the wheel.

The outer member of the wheel comprises a front plate or disc 30 and a rim 31 formed with flanges 32—33 to retain a cushion tire 45 on the outer face of the rim 31.

The cushion block holders of the inner and outer wheel members line up radially and the adjacent faces of the blocks 29 and 37 lie in contact (see Figs. 3 and 4).

Arranged circumferentially around the wheel between each group of holders 26—34, are cushion bearing blocks 38 in which are, preferably, embedded coil springs 39 whose ends lie against the rims 1 and 31, the axes of the springs lying radially.

The cushion holders 34 have extension ears 40 (see Figs. 4 and 5) that carry screw lugs 42 which pass through the back plate 41 of the outer member of the wheel and on which are washers 43 and nuts 44 to secure the back plate in place. The front and back plates 30 and 41 overlap the front and back walls 2ª and 12 of the inner member of the wheel and thereby keep the two members lined up.

A suitable tire, such as a cushion tire 45, may be secured on the rim 31 in any suitable way.

The axle 18 may be braced to the flange 20 by diagonal braces 46, as best shown in Figs. 2 and 3 of the drawings.

In Figs. 8 and 9 is shown a somewhat modified form of the invention. In this form the construction of the outer member of the wheel is substantially the same as in the previous form, comprising as it does the front plate 55, integral rim 56, flanges 57 and 58 and removable back plate 66; it also carries cushion block holders 59 for the blocks 61, the holders having ears 62 which carry screws 63 that penetrate the back plate 66 and receive the washers 64 and nuts 65.

The inner member is, however, somewhat differently formed from that of the preceding form of the invention. It comprises the rim 47, flanges 48 and 49 and dished front wall plate 50. The ball bearing unit is held directly within the confines of the rim 47 and comprises the races 51 and 52 and the balls 53. 54 designates the axle on which the wheel is mounted. A cushion tire 67 is carried on the rim 56.

From the foregoing it will be seen that I have provided a strong rugged resilient wheel that will reduce road shocks to a minimum.

The blocks 29—37 have frictional contact with each other and as the blocks 38 fill the space between adjacent block combinations 29—37, there will be no substantial slippage of the one member within the other when power is applied to turn the wheel.

In assembling the wheel, the blocks 37 are placed in their holders 34 and the blocks 29 are placed in their holders 26, the back plate 41 being of course removed. The blocks 38 are then placed in position on the inner member's rim 1 and the inner member is inserted into the outer member, after which the back plate 41 is put in place and secured by the nuts 44.

To remove the wheel (Figs. 1 to 4) from the axle, one need only remove cap 24, withdraw pin 23 and take off nut 22, whereupon the wheel can be withdrawn from the axle, leaving the bearing in the wheel.

In the form shown in Fig. 9 the wheel is removed from the axle after plate 66 is released, the bearing remaining on the axle.

In virtue of the cushion block holders 26 and 34 and the resilient blocks 29, 37 and 38, the flexion or deformation, due to the reactive forces of propulsion and retardation, applied to either the inner or the outer member of the wheel, are effectively cushioned and sudden shocks are reduced to the minimum if not entirely eliminated; starting and stopping of the vehicle is also made more smoothly than is possible with the ordinary type of wheels.

The parts of the wheel, not made of resilient material, may be made of any suitable metal, preferably aluminum or aluminum alloys, so as to keep the weight down as low as possible.

While I have shown but two forms of the invention, I wish it understood that many other changes in form, design and details of construction can be made by those skilled in the art without departing from the spirit of the invention or the scope of the appended claims.

What I claim is:

1. A wheel including an inner member and an outer member each having a rim, cushion block holders secured to the inner face of the rim of the outer member, cushion block holders secured to the outer face of the rim of the inner member, separate cushion blocks carried by said holders, the blocks of the inner and outer members having their adjacent faces in proximity to one another, resilient bearing blocks in the spaces between the rims and between adjacent groups of cushion blocks, and means to retain the parts in their assembled relations, said cushion block holders being spaced apart, said cushion block holders of the respective inner and outer members being spaced a substantial distance from one another in a radial direction.

2. A wheel including an inner member and an outer member each having a rim, cushion block holders secured to the inner face of the rim of the outer member, cushion block holders secured to the outer face of the rim of the inner member, separate cushion blocks carried by said holders, the blocks of the inner and outer members having their adjacent faces in proximity to one another, resilient bearing blocks in the spaces between the rims and between adjacent groups of cushion blocks, means to retain the parts in their assembled relations, said cushion block holders being spaced apart, and springs embedded in said bearing blocks, said cushion block holders of the respective inner and outer members being spaced a substantial distance from one another in a radial direction.

3. In a wheel having an inner rim member and an outer rim member the combination of cushion block holders spaced apart and secured to the inner face of the rim of the outer member, cushion block holders spaced apart and secured to the outer face of the rim of the inner member, the latter cushion block holders respectively being disposed in radial alignment with the former cushion block holders and spaced apart from the same, separate cushion blocks carried by said holders, the blocks of the inner and outer members having their adjacent faces in proximity to one another, resilient bearing blocks filling the spaces between the rims and between adjacent groups of cushion blocks, a front plate integral with the rim of the outer member, a detachable back plate, and means to secure said detachable back plate to the cushion block holders which are secured to said outer member rim.

4. A resilient wheel which includes an outer rim member, an inner rim member, a front plate integral with the outer rim member and overlying the inner rim member, a back plate detachably secured to the outer rim member and overlying the inner rim member, cushion block holders spaced apart and secured to the inner face of said outer rim member, cushion block holders spaced apart and secured to the outer face of said inner rim member, the block holders of one rim member being spaced apart from those of the other rim member and disposed respectively in radial alignment with the same, separate cushion blocks removably held in each holder, the blocks of the inner and outer rim members having their adjacent faces in proximity to one another, resilient bearing blocks filling the spaces between adjacent groups of cushion blocks, substantially as shown and described.

MANUEL BENITO y DE LA ROSA.